United States Patent

Masuda

(10) Patent No.: US 9,296,313 B2
(45) Date of Patent: Mar. 29, 2016

(54) CONVEYANCE SEAT

(71) Applicants: TOYOTA BOSHOKU KABUSHIKI KAISHA, Aichi-ken (JP); AISIN SEIKI KABUSHIKI KAISHA, Aichi-ken (JP); SHIROKI CORPORATION, Kanagawa-ken (JP)

(72) Inventor: Hideo Masuda, Aichi-ken (JP)

(73) Assignees: TOYOTA BOSHOKU KABUSHIKI KAISHA, Aichi-ken (JP); AISIN SEIKI KABUSHIKI KAISHA, Aichi-ken (JP); SHIROKI CORPORATION, Kanagawa-ken (JP)

(*) Notice: Subject to any disclaimer, the term of this patent is extended or adjusted under 35 U.S.C. 154(b) by 0 days.

(21) Appl. No.: 14/306,577

(22) Filed: Jun. 17, 2014

(65) Prior Publication Data

US 2014/0374561 A1    Dec. 25, 2014

(30) Foreign Application Priority Data

Jun. 20, 2013  (JP) .................................. 2013-129170

(51) Int. Cl.
    *B60N 2/07*    (2006.01)
(52) U.S. Cl.
    CPC ............ *B60N 2/0715* (2013.01); *B60N 2/0705* (2013.01); *B60N 2/0722* (2013.01)
(58) Field of Classification Search
    CPC ........... B60N 2/0715; B60N 2/07; B60N 2/06
    USPC .......................... 248/429, 419, 421; 297/341
    See application file for complete search history.

(56) References Cited

U.S. PATENT DOCUMENTS

| 4,949,931 | A | | 8/1990 | Fujiwara et al. | |
|---|---|---|---|---|---|
| 5,575,564 | A | * | 11/1996 | Harmon et al. | 384/34 |
| 5,746,409 | A | * | 5/1998 | Rees | 248/422 |
| 6,231,022 | B1 | * | 5/2001 | Becker et al. | 248/429 |
| 7,461,898 | B2 | * | 12/2008 | Kojima | 297/341 |
| 8,967,583 | B2 | * | 3/2015 | Stoia | 248/429 |
| 2004/0089785 | A1 | * | 5/2004 | McCullen et al. | 248/429 |
| 2005/0231016 | A1 | * | 10/2005 | Kojima | 297/363 |
| 2014/0110554 | A1 | * | 4/2014 | Oya et al. | 248/430 |
| 2014/0374562 | A1 | * | 12/2014 | Masuda | 248/429 |

FOREIGN PATENT DOCUMENTS

| CN | 1676366 | A | 10/2005 |
|---|---|---|---|
| CN | 101274598 | A | 10/2008 |
| CN | 201136448 | Y | 10/2008 |
| CN | 101844524 | A | 9/2010 |
| JP | 2002-160554 | | 6/2002 |

OTHER PUBLICATIONS

Chinese Office Action in counterpart application No. CN201410280062.2, dated Dec. 28, 2015 (with partial English-language translation).

* cited by examiner

*Primary Examiner* — Anita M King
(74) *Attorney, Agent, or Firm* — Greenblum & Bernstein, P.L.C.

(57) ABSTRACT

A conveyance seat includes a slide mechanism. The slide mechanism includes an upper rail, and a lower rail provided with a cutout. The cutout is formed so that no corner is formed by a front edge and an upper edge of the lower rail.

4 Claims, 6 Drawing Sheets

CONVEYANCE SEAT

INCORPORATION BY REFERENCE

The disclosure of Japanese Patent Application No. 2013-129170 filed on Jun. 20, 2013 including the specification, drawings and abstract is incorporated herein by reference in its entirety.

BACKGROUND OF THE INVENTION

1. Field of the Invention

The invention relates to a conveyance seat, and in particular, to a conveyance seat including a slide mechanism that consists of lower rails and upper rails.

2. Description of Related Art

Seats for vehicles, such as automobiles, which can be arranged in various ways, are known. For example, in Japanese Patent Application Publication No. 2002-160554 (JP 2002-160554 A), a vehicle seat 101 that can be arranged such that a seat cushion 102 can slide back and forth relative to a vehicle floor f is disclosed, as shown in FIG. 5 and FIG. 6. Namely, the vehicle seat 101 disclosed in JP 2002-160554 A includes a slide mechanism 130 that consists of lower rails 132, 132 and upper rails 134, 134. With this arrangement, the position of the seat cushion 102 in the longitudinal direction can be adjusted in accordance with the physical frame or size of a person seated in the seat, thus making the seated person more comfortable in the cabin.

SUMMARY OF THE INVENTION

With the technology of JP 2002-160554 A as described above, each of the lower rails 132, 132 is directly secured to the vehicle floor f, with bolts b received in two bolt holes f1, f2 formed in the vehicle floor f, without using brackets, such as legs, interposed between the lower rail 132 and the floor f. Therefore, as compared with the case where the lower rails 132, 132 are secured to the vehicle floor f with brackets, such as legs, interposed therebetween, the length of the lower rails 132, 132 needs to be made large. This is because the positions of the bolt holes f1, f2 formed in the vehicle floor f cannot be changed, and the length of the lower rail 132, 132 needs to be large, for the length of the brackets. However, if the length of the lower rails 132, 132 is large, the feet of the person to be seated may interfere with the front end of the lower rail 132 when he/she gets in or out of the vehicle, resulting in reduced ease of getting in and out of the vehicle.

The invention provides a conveyance seat that improves the ease of getting in and out of the vehicle, even if it includes a slide mechanism.

A conveyance seat according to one aspect of the invention includes a slide mechanism, and the slide mechanism includes an upper rail, and a lower rail provided with a cutout. The cutout is formed so that no corner is formed by a front edge and an upper edge of the lower rail. With this arrangement, even if the length of the lower rail of the slide mechanism is made large, the feet of a person to be seated are less likely or unlikely to interfere with the front end of the lower rail when he/she gets in or out of the vehicle. Accordingly, the person to be seated is able to get in and out of the vehicle with improved ease and safety.

In the conveyance seat according to the above aspect of the invention, the cutout may be formed in a shape of a rounded recess. With this arrangement, as compared with the case where the cutout is formed in the shape of a rounded protrusion, the feet of the person to be seated are less likely to interfere with the front end of the lower rail when he/she gets in or out of the vehicle. Accordingly, the person to be seated can get in and out of the vehicle with improved ease and safety.

In the conveyance seat according to the above aspect of the invention, the lower rail may be secured to a vehicle floor, at least at a position corresponding to a portion of the lower rail in which the cutout is formed. With this arrangement, in contrast to the case where the lower rail is secured to the vehicle floor at a position different from the position corresponding to the portion of the lower rail in which the cutout is formed, there is no need to separately form work space, such as a cutout, namely, work space used when a bolt is tightened with a tool, in the lower rail. Accordingly, the shape of the lower rail can be simplified.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Referring to FIG. 1 through FIG. 4, one embodiment of the invention will be described. In the following description, "vehicle seat 1" will be described as an example of "conveyance seat". Also, in the following description, the terms "up", "down", "front", "rear", "left" and "right" indicate respective directions denoted by arrows labelled "up", "down", "front", "rear", "left" and "right" in FIGS. 1 to 4, namely, upward, downward, forward, and rearward from the vehicle seat 1 when installed inside a vehicle (not shown), and to the left and the right of the vehicle seat 1, respectively.

Figure 1:
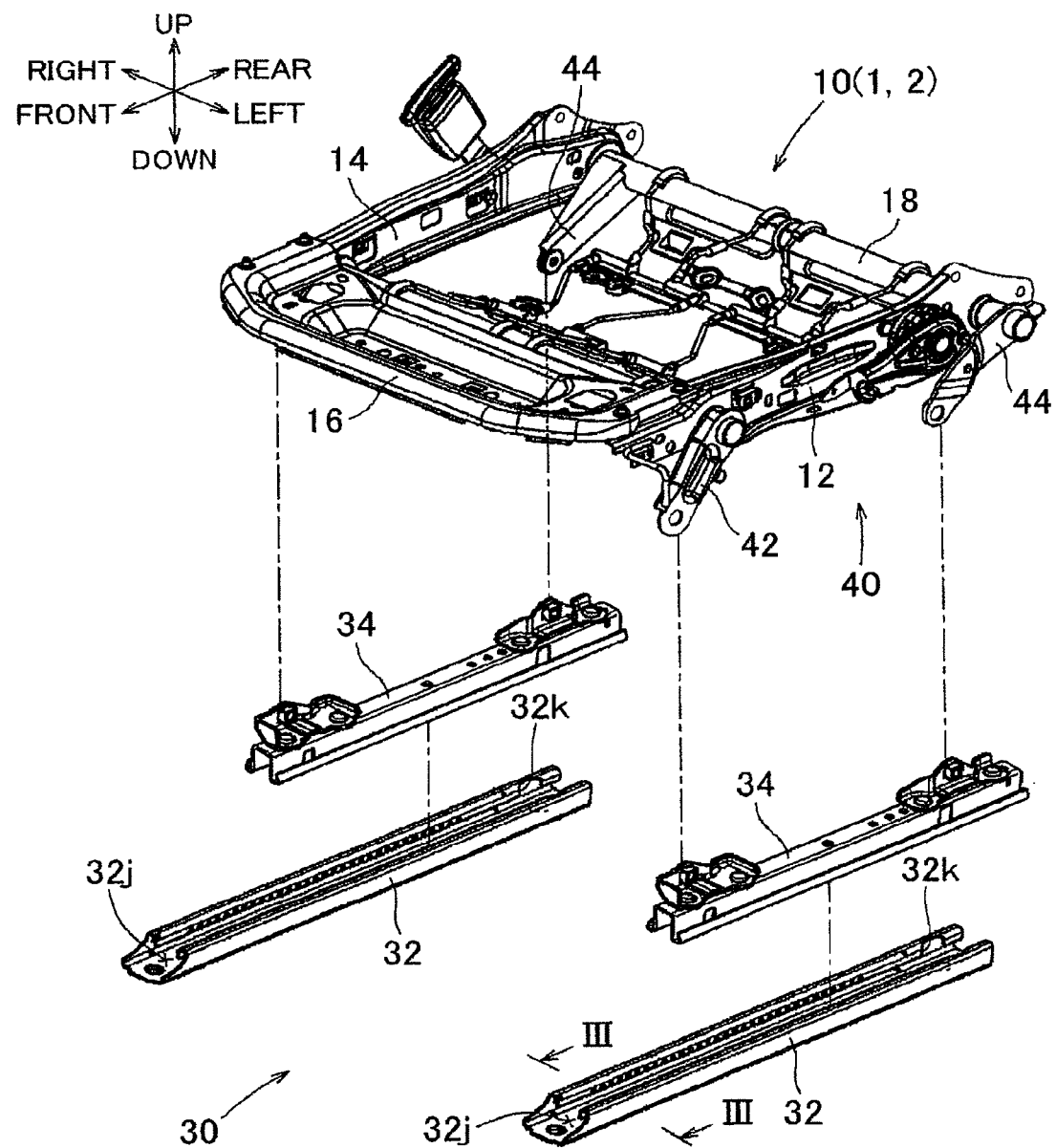
FIG. 1 is a partially exploded perspective view of a slide mechanism and a lifter mechanism included in a cushion frame of a seat cushion of an vehicle seat according to one embodiment of the invention.
Figure 2:
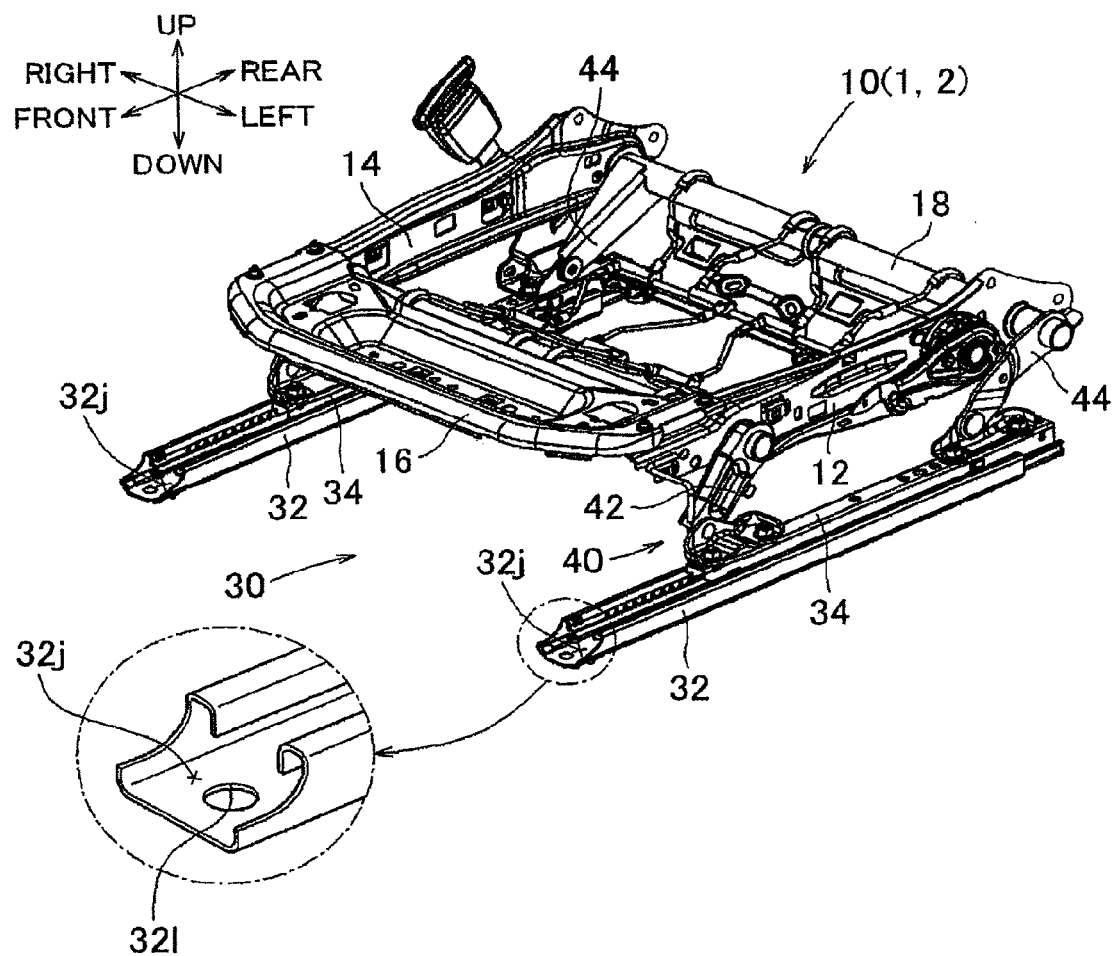
FIG. 2 is a perspective view of the conveyance seat of FIG. 1 in a condition where the slide mechanism and lifter mechanism are assembled together.

Referring first to FIGS. 1-2, the construction of the vehicle seat 1 will be described. The vehicle seat 1 is a passenger seat (the left-hand seat in the vehicle compartment in this embodiment), and consists principally of a seat cushion 2 and a seat back (not shown). In the following, the seat cushion 2, out of the seat cushion 2 and the seat back (not shown), will be described in detail. The seat back (not shown) may be a known seat back, and thus will not be described in detail.

The seat cushion 2 consists of a cushion frame 10 that forms its framework, a known seat cushion pad (not shown) mounted on the cushion frame 10 so as to wrap around the frame 10, and a known seat cushion cover (not shown) that covers a surface of the seat cushion pad (not shown).

In FIGS. 1 to 4, the seat cushion pad and the seat cushion cover are not illustrated, so that the structure of the frame inside the seat cushion 2 can be easily viewed. The cushion frame 10 is formed in the shape of a generally rectangular frame that consists of a left side frame 12, a right side frame 14, a front panel 16 that extends between the front sides of the left and right side frames 12, 14, and a rear rod 18 that extends between the rear sides of the left and right side frames 12, 14. The seat cushion 2 is constructed in this fashion.

The thus constructed seat cushion 2 includes a slide mechanism 30 and a lifter mechanism 40. In the following, the slide mechanism 30 and the lifter mechanism 40 will be individually described.

Figure 3:
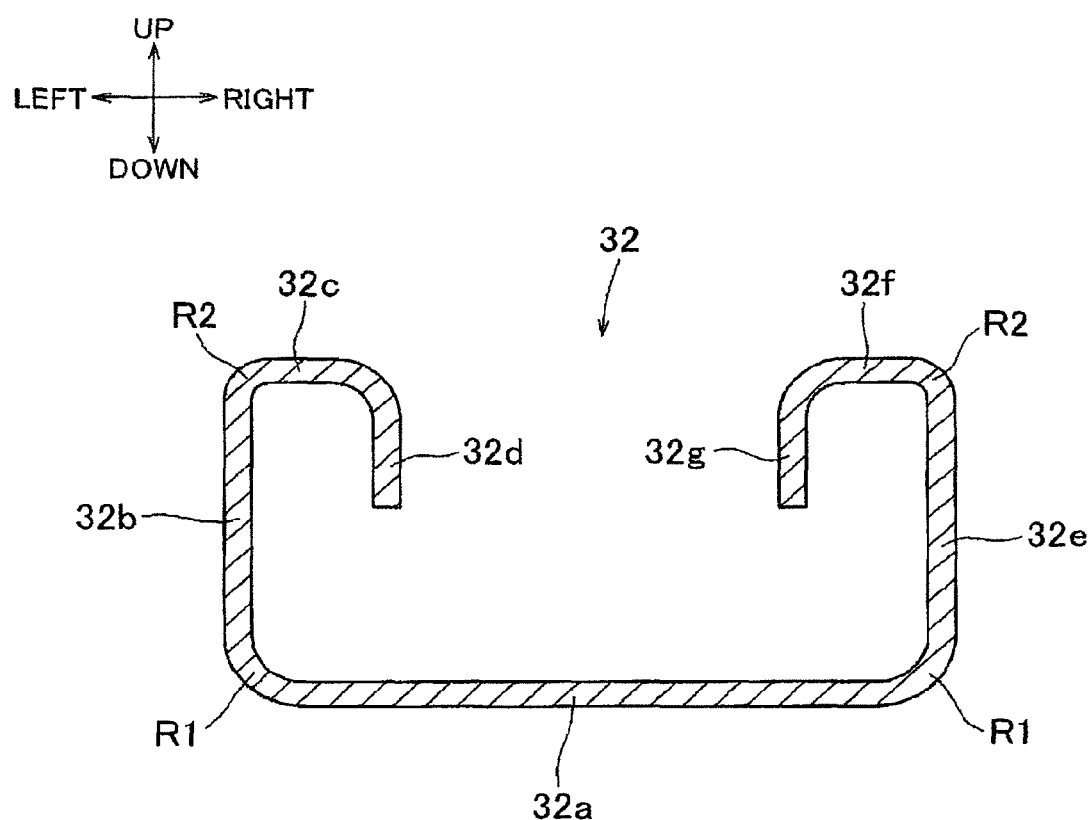
FIG. 3 is a cross-sectional view taken along line III-III of FIG. 1.

Initially, the slide mechanism 30 will be described. The slide mechanism 30 consists of a pair of left and right lower rails 32, 32, and a pair of left and right upper rails 34, 34 that are slidable relative to the left and right lower rails 32, 32. As shown in FIG. 3, the left lower rail 32, which is formed by bending through press forming, has a bottom portion 32a, an outer side portion 32b, an outer upper portion 32c, an outer folded portion 32d, an inner side portion 32e, an inner upper portion 32f, and an inner folded portion 32g.

As is apparent from FIG. 3, each of a lower corner formed by the bottom portion 32a and the outer side portion 32b and a lower corner formed by the bottom portion 32a and the inner side portion 32e has a rounded shape, and will be called "chamfered portion R1". Similarly, each of an upper corner formed by the outer side portion 32b and the outer upper portion 32c and an upper corner formed by the inner side portion 32e and the inner upper portion 32f has a rounded shape, and will be called "chamfered portion R2".

Figure 4:
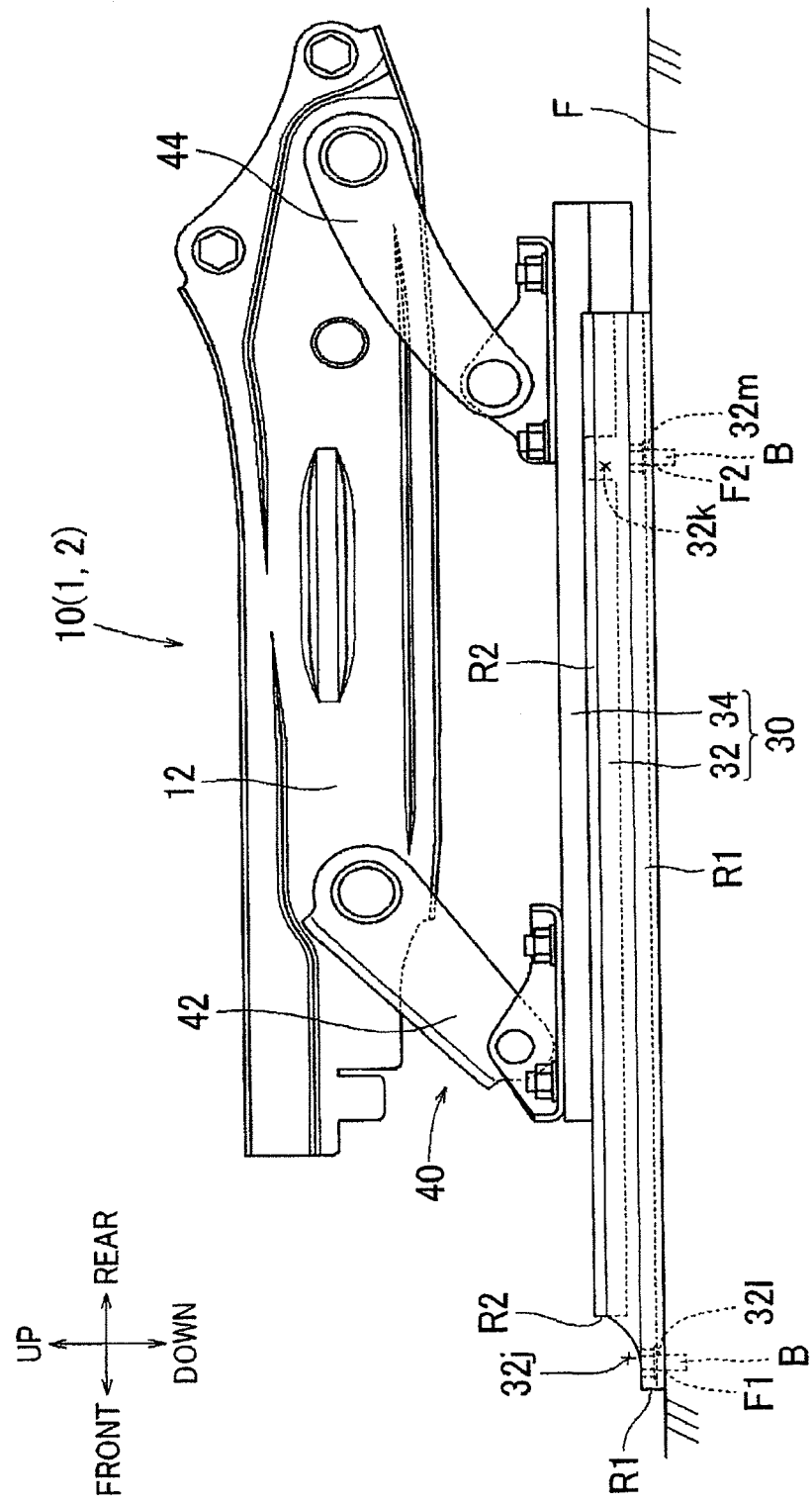
FIG. 4 is a left side view of the cushion frame of FIG. 1 when it is mounted on a vehicle floor.
Figure 5:
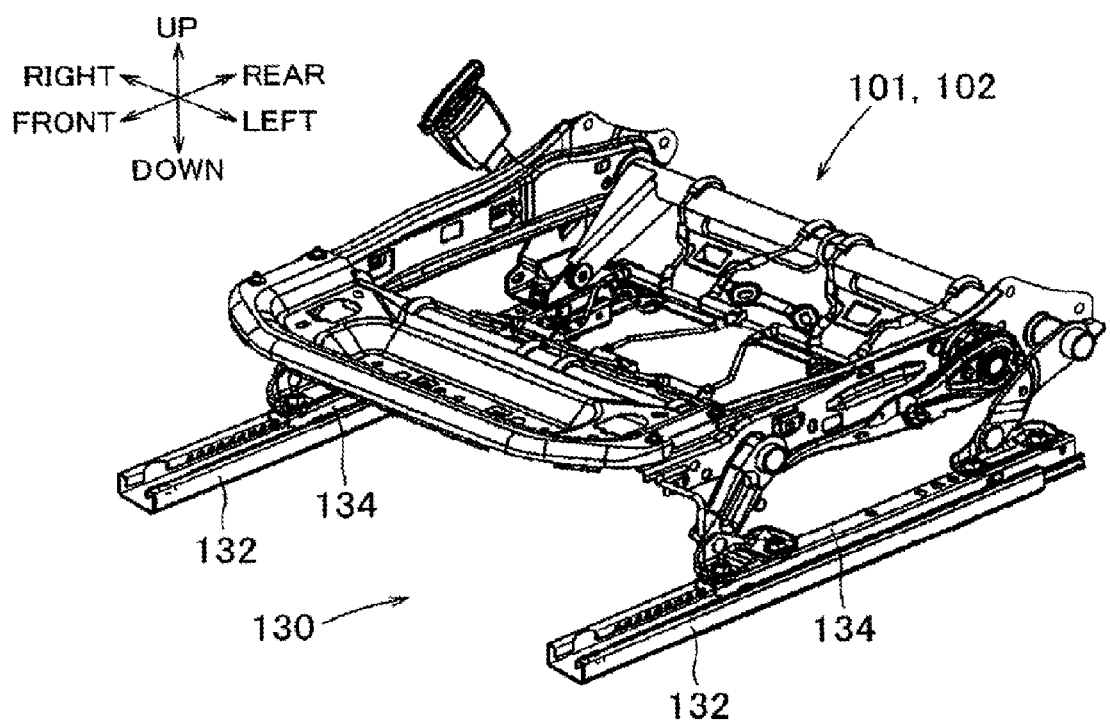
FIG. 5 is a perspective view of a cushion frame of a seat cushion of a vehicle seat according to the related art.
Figure 6:
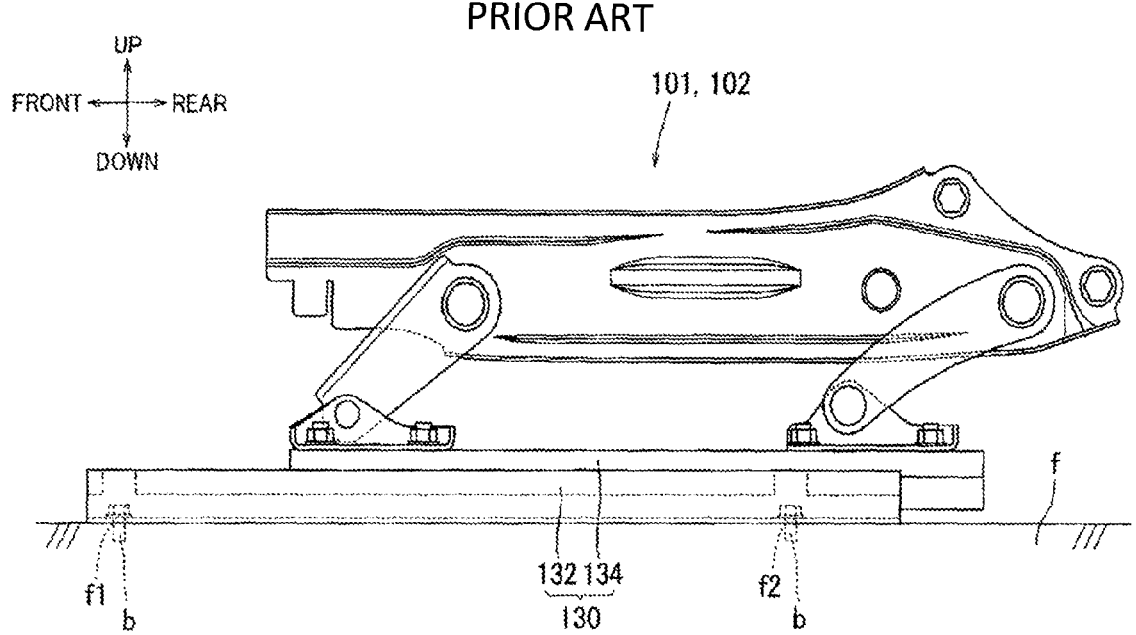
FIG. 6 is a left side view of the cushion frame of FIG. 5 when it is mounted on the vehicle floor.

As is apparent from the partially enlarged view of FIG. 2 and FIG. 4, parts of front edge and upper edge of the left lower rail 32 are cut out to form a "first cutout 32j", so that no corner is formed by these edges. Namely, the first cutout 32j is formed so that no corner is formed at corresponding ends of the front edge and upper edge of the left lower rail 32.

The first cutout 32j as described above is an example of "cutout that is formed so that no corner is formed by the front edge and upper edge of the lower rail" as stated in the appended claim. As shown in FIG. 4, the first cutout 32j is formed in the shape of a rounded recess, such that the chamfered portions R1 and the chamfered portions R2 remain so as to form vertical straight lines. A bolt hole 32l through which a bolt B can pass is formed in the bottom portion 32a of the left lower rail 32, at a position corresponding to its portion where the first cutout 32j is formed.

Also, a bolt hole 32m through which a bolt B can pass is formed at a rear position, in the bottom portion 32a of the left lower rail 32. A second cutout 32k is formed in the inner folded portion 32g of the left lower rail 32, so that the bolt B inserted in the bolt hole 32m can be tightened with a tool (not shown). Namely, the second cutout 32k provides work space used when the bolt B inserted in the bolt hole 32m is tightened with the tool (not shown). Also, the left upper rail 34 is formed slidably relative to the left lower rail 32.

On the other hand, the right lower rail 32 and the right upper rail 34 are formed symmetrically in the lateral direction with respect to the left lower rail 32 and the left upper rail 34. Each of the left and right lower rails 32, 32 is secured to the vehicle floor F, with two bolts B received in the two bolt holes 32l, 32m and two bolt holes F1, F2 formed in the vehicle floor F. The portions of the lower rail which are secured to the vehicle floor F with the two bolts B are examples of "secured portion" as stated in the appended claims. With this arrangement, the seat cushion 2 can slide back and forth, relative to the vehicle floor F. The slide mechanism 30 is constructed in this fashion.

Next, the lifter mechanism 40 will be described. The lifter mechanism 40 consists of a pair of left and right front links 42, 42, and a pair of left and right rear links 44, 44. The left front link 42 is pivotally attached to the left side frame 12 and the left upper rail 34 so as to extend between the front side of the left side frame 12 and the front side of the left upper rail 34. Also, the left rear link 44 is pivotally attached to the left side frame 12 and the left upper rail 34 so as to extend between the rear side of the left side frame 12 and the read side of the left upper rail 34. The left front link 42 and the left rear link 44 are arranged to form parallel links.

On the other hand, the right front link 42 is arranged symmetrically in the lateral direction with respect to the left front link 42, and is pivotally attached to the right side frame 14 and the right upper rail 34 so as to extend between the front side of the right side frame 14 and the front side of the right upper rail 34. Also, the right rear link 44 is arranged symmetrically in the lateral direction with respect to the left rear link 44, and is pivotally attached to the right side frame 14 and the right upper rail 34 so as to extend between the rear side of the right side frame 14 and the rear side of the right upper rail 34.

The right front link 42 and the right rear link 44 are arranged to form parallel links. Thus, when the left rear link 44 is operated, for example, the right rear link 44 also moves along with the left and right front links 42, 42, so that the seat cushion 2 can be moved up and down relative to the vehicle floor F. The lifter mechanism 40 is constructed in this fashion.

The vehicle seat 1 according to this embodiment of the invention is constructed as described above. In the seat 1 thus constructed, the front edge and upper edge of the left lower rail 32 are cut out so that no corner is formed by these edges. Namely, the first cutout 32j is formed so that no corner is formed at corresponding ends of the front edge and upper edge of the left lower rail 32. The right lower rail 32 is constructed in the same manner. Therefore, even if the length of the lower rails 32, 32 of the slide mechanism 30 is increased, the passenger's feet are less likely or unlikely to interfere with the front end of the lower rail 32 when he/she gets in and out of the vehicle. Accordingly, the passenger can get in and out of the vehicle with improved ease and safety.

With the above arrangement, the first cutout 32j is formed in the shape of a rounded recess, so that the chamfered portions R1 and the chamfered portions R2 remain so as to form vertical straight lines. Therefore, as compared with the case where the first cutout 32j is formed in the shape of a rounded protrusion, for example, the passenger's feet are less likely to interfere with the front end of the lower rail 32 when he/she gets in or out of the vehicle. Accordingly, the passenger can get in and out of the vehicle with improved ease and safety.

Also, with the above arrangement, each of the left and right lower rails 32, 32 is secured to the vehicle floor F, with two bolts B received in the two bolt holes 32l, 32m and the two bolt holes F1, F2 formed in the vehicle floor F. The bolt hole 32l through which the bolt B can pass is formed in the bottom portion 32a of each of the left and right lower rails 32, 32, at a position corresponding to a portion of the bottom portion 32a in which the first cutout 32j is formed. Thus, in contrast to the case where the bolt hole 32l is formed at a position different from the position corresponding to the portion in which the first cutout 32j is formed, there is no need to separately form work space, such as a cutout, in each of the left and right lower rails 32 (i.e., work space used when the bolt B is tightened with a tool). Accordingly, the shape of the left and right lower rails 32, 32 can be simplified.

The above-described content is concerned with one embodiment of the invention, but it does not mean that the present invention is limited to the above content. In this embodiment, the "vehicle seat 1" has been described as an example of "conveyance seat". However, the invention is not limitedly applied to the "vehicle seat", but may be applied to seats for various types of conveyances or means of transportation, such as "ship seat", "airplane seat", and "rail vehicle seat", for example.

What is claimed is:

1. A conveyance seat comprising:
    a slide mechanism including:
        an upper rail; and
        a lower rail provided with a cutout, the cutout being formed so that no corner is formed by a front edge and an upper edge of the lower rail,
    wherein the cutout is formed such that a portion of the lower rail that defines a border of the cutout forms a vertical straight line extending downward from the upper edge of the lower rail.

2. The conveyance seat according to claim 1, wherein the cutout is formed in a shape of a rounded recess.

3. The conveyance seat according to claim 1, wherein the lower rail is secured to a vehicle floor, at least at a position corresponding to a portion of the lower rail in which the cutout is formed.

4. The conveyance seat according to claim 2, wherein the lower rail is secured to a vehicle floor, at least at a position corresponding to a portion of the lower rail in which the cutout is formed.

* * * * *